United States Patent [19]

Cook

[11] Patent Number: 5,327,845
[45] Date of Patent: Jul. 12, 1994

[54] APPARATUS FOR FASTENING AND ADJUSTING A LINE

[76] Inventor: Peter Cook, 2930 NE. 19th St., Pompano Beach, Fla. 33062

[21] Appl. No.: 970,619

[22] Filed: Nov. 3, 1992

[51] Int. Cl.$^5$ .............................................. B63B 21/00
[52] U.S. Cl. ................................. 114/218; 24/134 R
[58] Field of Search ............ 114/218, 219, 230, 221 R, 114/343; 24/115 R, 129 R, 130, 132 R, 133, 134 R, 132 AA

[56] References Cited

U.S. PATENT DOCUMENTS

| | | | |
|---|---|---|---|
| D. 248,367 | 11/1976 | Haft | D8/356 |
| 2,573,806 | 11/1951 | Paterson | 24/126 |
| 2,942,315 | 6/1960 | Johnson | 24/134 |
| 3,650,236 | 3/1972 | McFarlane | 114/218 |
| 3,678,876 | 7/1972 | Alter | 114/218 |
| 4,114,553 | 9/1978 | Zidek | 114/218 |
| 4,143,446 | 3/1979 | Down | 24/115 |
| 4,278,042 | 7/1981 | Lindquist | 114/218 |
| 4,324,193 | 4/1982 | Cutler | 114/199 |
| 4,660,493 | 4/1987 | Lowry, III | 114/218 |
| 4,887,337 | 12/1989 | Bateman | 24/136 |
| 4,895,094 | 1/1990 | Carlstedt | 114/218 |
| 4,993,123 | 2/1991 | Siwek | 24/136 |
| 4,998,495 | 3/1991 | Bos et al. | 114/218 |
| 5,008,981 | 4/1991 | Smithson | 24/49 |
| 5,068,949 | 12/1991 | Horace | 24/115 |

Primary Examiner—David M. Mitchell
Assistant Examiner—Stephen P. Avila
Attorney, Agent, or Firm—McCormick, Paulding & Huber

[57] ABSTRACT

An apparatus is provided for fastening a line, such as a line supporting a fender on a marine vessel. The apparatus has a body portion defining an aperture for receiving the line, and a lever coupled to the body portion and defining a passageway between the lever and the body portion for receiving the line passed through the aperture. A biasing mechanism normally biases the lever into engagement with the line extending through the passageway to fasten the line to the apparatus.

24 Claims, 3 Drawing Sheets

APPARATUS FOR FASTENING AND ADJUSTING A LINE

FIELD OF THE INVENTION

The present invention relates to fastening apparatus, and more particularly, to apparatus for fastening and adjusting lines, such as lines on marine vessels, which permit lines to be rapidly secured, released and/or adjusted.

BACKGROUND INFORMATION

There are various known devices for fastening and adjusting lines on marine vessels, and particularly for fastening and adjusting a line suspending a fender. A fender is a soft bumper, typically made from a rubber-like material, which in some instances is inflated, or another material for absorbing impact, and is suspended on a line over the side of a marine vessel in order to protect the vessel when docked. The fender line is typically tied to a rail extending along the deck on the side of the vessel or to a cleat on the deck.

One known device for securing a fender line to a rail is called the "FEND-R-CLIP", which is basically a single piece of sheet metal, in which one end is bent into a c-shaped clip for attachment to the rail, and which has an elongated aperture for receiving the line. The elongated aperture is circular on one end and tapers down to a narrow width on the other end, so that the line can be pulled down through the aperture, and fixed in place by being squeezed between the tapered surfaces of the aperture. Although this is an inexpensive device, the line is not always easily pulled through the circular part of the aperture, and when fixing the line in place by jamming the line between the tapered sides of the aperture, the line can become frayed.

Another known device is the BUMPER BUDDY ®, manufactured by Idea Development Company of Issaquah, Wash. This device is made from a unitary piece of plastic, and includes a pair of c-shaped clip portions for attachment to a rail, and several apertures for running the line through the device, and a cleat portion for fixing the line in place after it is passed through the apertures. Although this device is relatively inexpensive to make, it is relatively time-consuming to pass the line through the apertures and to then fix the line with the cleat portion. In addition, once the line is fixed in place, it is relatively difficult to adjust the position of the fender by pulling the line through the various apertures.

Another known device for supporting a fender is manufactured by NHS Marine Company in Florida, which has a plastic strap with a snapping lock mechanism for attachment of the strap to a rail. A metal portion defines a passageway for passing the line through the device, and a sliding metal roller with a knurled or ridged surface is seated within the passageway. As the line is pulled down through the passageway, the sliding metal roller is pulled down with the line so as to restrict the passageway and secure the line in place. The sliding metal roller can be difficult to manipulate, thus rendering adjustment of the fender line difficult too.

It is an object of the present invention to provide an apparatus for rapidly and easily fastening, releasing, and adjusting a line, such as a line suspending a fender on a marine vessel, which overcomes the drawbacks and disadvantages of the prior art.

SUMMARY OF THE INVENTION

The present invention is directed to an apparatus for fastening a line, such as a line supporting a fender on a marine vessel. The apparatus includes a body portion defining at least one aperture for receiving the line, and a lever coupled to the body portion and defining a passageway between a first end of the lever and the body portion for receiving the line passed through the aperture. A biasing mechanism of the apparatus is coupled between a second end of the lever and the body portion, and normally biases the first end of the lever into engagement with the line extending through the passageway to fasten the line to the apparatus.

In one embodiment of the present invention, the body portion defines a first aperture for receiving the line through the apparatus, and a second aperture in communication with the passageway for receiving the line after wrapping the line around a fixture to secure the line and the apparatus to the fixture. The lever may be pivotally mounted to the body portion, with a biasing force being provided by several possible means, such as that provided by a coil spring seated between the lever and the body portion.

In one embodiment of the present invention, the passageway between the lever and the body portion is defined by an elongated recess formed in at least one of the lever and the body portion for receiving the line extending through the aperture. The recess is preferably substantially semi-circular shaped, and is defined by a surface including a plurality of raised surface areas and corresponding recessed surface areas for engaging the line. In one embodiment of the present invention, the raised surface areas and corresponding recessed surface areas define a plurality of teeth for engaging the line.

In another embodiment of the present invention, the apparatus further includes a modular attachment component for coupling the apparatus to a supporting fixture. The modular attachment component may include any of various means for attaching the apparatus to a supporting fixture, including a flexible clip, or a body portion defining an aperture for receiving a line through the aperture. In one embodiment of the present invention, either the body portion or the modular attachment component defines a recess, and the other includes an elongated raised portion which is received within the recess for coupling the modular attachment component to the body portion. The elongated raised portion preferably defines a pair of tapered surfaces on either side of the raised portion, and the recess is defined by a corresponding pair of tapered surfaces for securing the raised portion within the recess.

One embodiment of the present invention further includes a plunger coupled to either the body portion or the modular attachment component. The plunger preferably includes a biasing mechanism for biasing the plunger into either the body portion or the modular attachment component, to substantially fix the body portion and modular attachment component relative to each other.

One advantage of the apparatus of the present invention, is that the apparatus can be used to rapidly and easily support and adjust a line suspending a fender on a marine vessel. Once the line is received through the aperture and the body portion, the lever can be manipulated to easily adjust the position of the line relative to the apparatus, and thus to adjust the position of the fender. For example, to raise the fender, the lever is simply squeezed toward the body portion, thus opening the passageway between the lever and the body portion, and the line can then be pulled through the apparatus to raise the fender. To lower the fender, on the other hand, the lever can then again be simply squeezed to open the passageway between the lever and the body portion, and thus permit the fender to slowly descend under the force of gravity. When the fender reaches its desired location, the lever is released, thus permitting the biasing mechanism to drive the lever into engagement with the line extending through the passageway, to fix the line relative to the apparatus.

Other advantages of the apparatus of the present invention will become apparent in view of the following detailed description and accompanying drawings.

DETAILED DESCRIPTION

Figure 1:
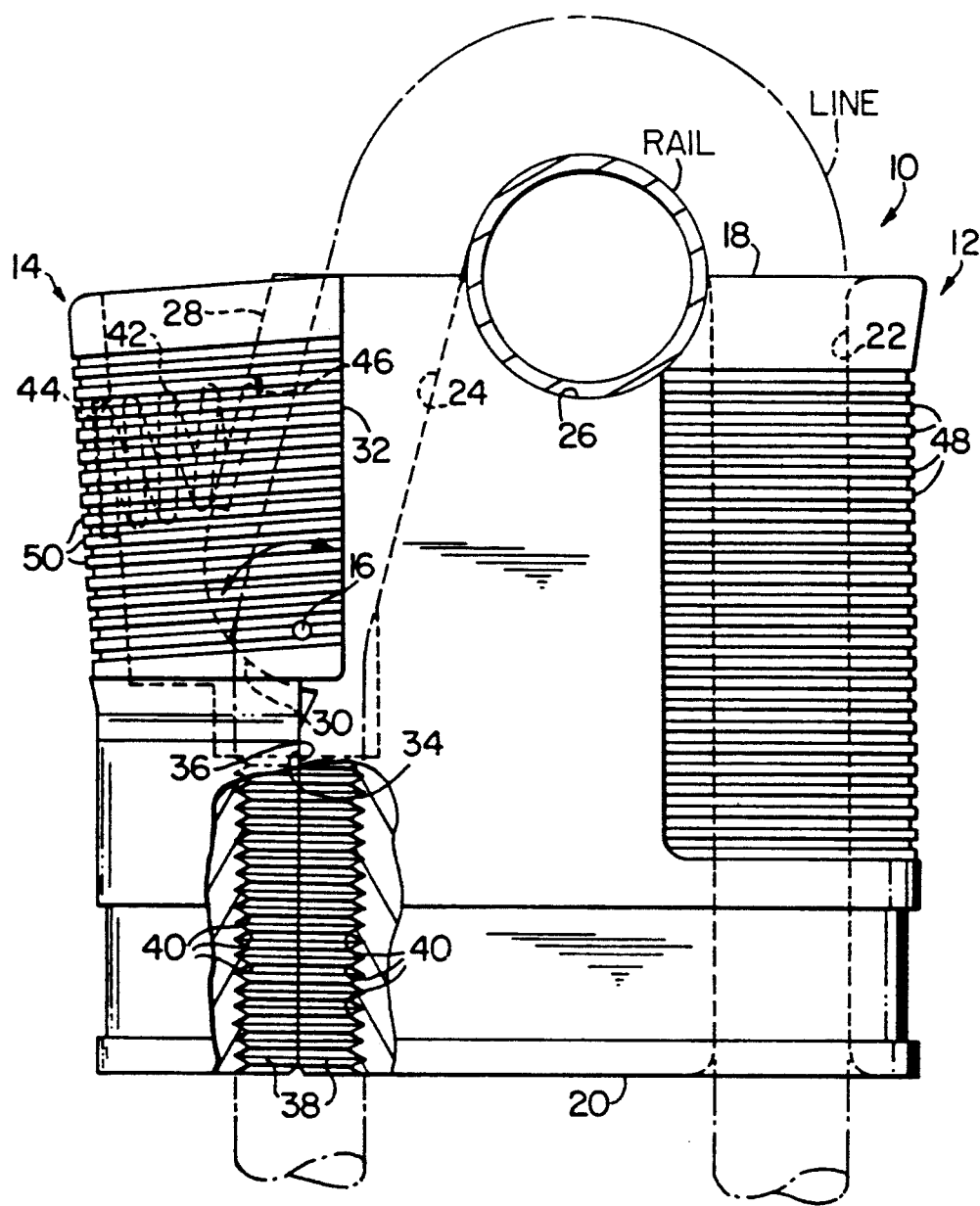
FIG. 1 is a side plan view, in partial cross-section, of an apparatus embodying the present invention for fastening and adjusting a line supporting a fender on a marine vessel.
Figure 3:
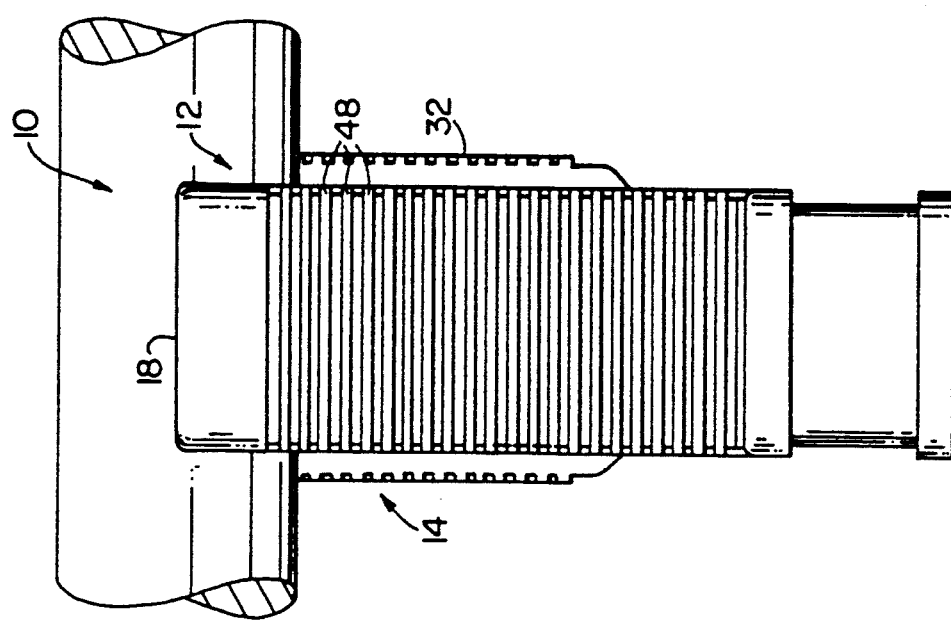
FIG. 3 is an end plan view of the apparatus of FIG. 1.
Figure 2:
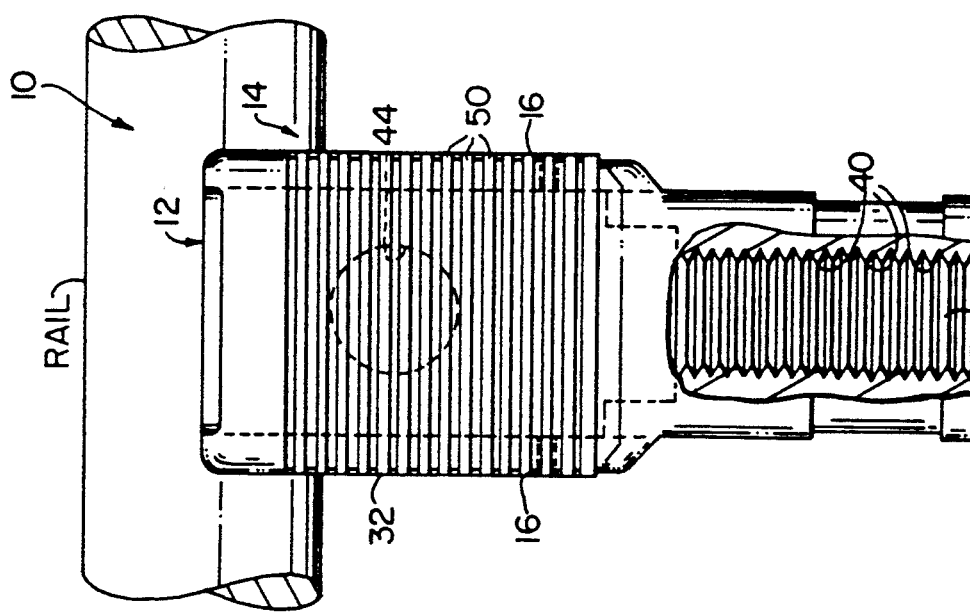
FIG. 2 is a front plan view of the apparatus of FIG. 1.

In FIGS. 1–3, an apparatus embodying the present invention for fastening and adjusting a line supporting a fender (not shown) is indicated generally by the reference numeral 10. The apparatus 10 includes a body portion 12 and a release lever 14, which is pivotally coupled to the body portion 12 by means of a pivot pin 16. The body portion 12 includes a top surface 18 and a bottom surface 20, and a first bore 22 extending through one side of the body portion between the top and bottom surfaces. A second bore 24 extends through the top surface 18 on the other side of the body portion relative to the first bore 22, and a semi-circular cut-out 26 is formed in the top surface 18 between the first and second bores 22 and 24, respectively. The semi-circular cut-out 26 is shaped to be seated against, and receive at least a portion of a rail on the vessel, as shown in FIG. 1.

The apparatus 10 is used to fasten and adjust a fender line (illustrated in dashed lines in FIG. 1) by passing the free end of the line through the opening in the bottom surface 20 of the first bore 22, up through the first bore 22 and over the rail, and down into the opening in the second bore 24 in the top surface 18. The release lever 14 is then squeezed and pivoted about the pivot pin 16 to permit passage of the line between the release lever 14 and body portion 12. The lever 14 is then released to secure the line in place and support the fender from the rail seated within the cut-out 26, as is described further below.

As shown in FIG. 1, the edges defining the bore 22 in the top and bottom surfaces 18 and 20, respectively, are preferably either chamfered or formed with a smooth radius to facilitate insertion of the line and prevent fraying of the line as it is passed through the respective bore. The edge defining the second bore 24 in the top surface 18 is likewise preferably formed in the same fashion to facilitate insertion and prevent fraying of the line.

As also shown in FIG. 1, the first bore 22 is substantially parallel with the longitudinal axis of the body portion 12, whereas the second bore 24 is oriented at an angle relative to the longitudinal axis, and tapers inwardly from about the mid-section of the body portion toward the top surface 18. In the embodiment of the present invention illustrated, the second bore 24 is oriented at an angle of approximately 15° relative to the longitudinal axis of the body portion.

As also shown in FIG. 1, the body portion 12 defines a sloped surface 28 (illustrated in dashed lines), which extends from the top surface 18 along one side of the body portion adjacent the second bore 24, and terminates in a curved section 30 (also illustrated in dashed lines) located approximately at the mid-section of the body portion 12. The slope of the surface 28 is approximately the same as that of the second bore 24, and the other end of the second bore 24 terminates in the curved section 30. As shown in FIG. 1, the surfaces 28 and 30 are received within a recess defined within a top portion 32 of the lever 14, thus permitting the lever 14 to be pivoted about the pivot pin 16 relative to the body portion 12, as indicated by the arrow in FIG. 1.

The body portion 12 defines a substantially straight surface 34 extending between the curved section 30 and the bottom surface 20, and the lever 14 similarly defines a straight surface 36 normally seated against the straight surface 34, as shown in FIG. 1. Both straight surfaces 34 and 36 each define a substantially semi-circular cut-out 38 extending along the length of the respective straight surface and oriented substantially parallel to the first bore 22. As can be seen, the surface of each cut-out 38 is defined by a plurality of teeth 40, which are used to secure the line in place when the lever 14 is in the normally closed position.

A coil spring 42 is seated between the lever 14 and body portion 12, as shown in dashed lines in FIG. 1, which normally biases the lever 14 in the closed position. The top portion 32 of the lever 14 defines a recess 44 on an inside surface for receiving one end of the spring 42, and the sloped surface 28 defines a recess 46 for receiving the other end of the spring 42, as also shown in dashed lines in FIG. 1. The spring 42 is thus secured in place between the recesses 44 and 46, normally biasing the top portion 32 of the lever 14 away from the body portion 12, and in turn biasing the teeth 40 toward each other to engage the line passed between the lever and the body portion and secure the line in place.

As shown in FIG. 1, the body portion 12 includes a plurality of ribs 48 spaced apart from each other along one side of the body portion, and the lever 14 similarly includes a plurality of ribs 50 spaced apart from each other along the outside surface of the top portion 32. The ribs 48 and 50 facilitate a user's ability to grip the apparatus between the fingers of a hand, and manipulate the lever 14 to secure and/or adjust a line, as is described below.

In the operation of the present invention, the apparatus 10 is used to support a fender (not shown) from a rail on the vessel, so that the fender can be easily adjusted to a desired location relative to the rail and vessel and secured in place. The free end of the line is passed through the first bore 22, from the bottom surface 20 up through the top surface 18, over the rail, and into the second bore 24. The user then squeezes the top portion 32 of the lever 14 toward the body portion 12, preferably by gripping the ribs 48 and 50 between the fingers of a hand, which in turn causes the straight surface 36 of the lever 14 to move away from the body portion 12, and open the passage between the lever and body portion to receive the line. Once the line is passed through, the user than can adjust the location of the fender and secure the line in place by simply manipulating the lever 14 and/or by pulling the line through the apparatus.

For example, to raise the fender, the lever 14 can be opened to pull the teeth 40 away from each other, and the line is simply pulled through the bores 22 and 24 and over the rail until the fender reaches its desired setting. The line is then secured in place by simply releasing the lever 14, causing the teeth 40 to engage the line and fix it in relation to the apparatus 10. The weight of the fender pulls the line extending through the first bore 22 taut so that the rail is received within the cut-out 26, thus securing the fender in place. The fender can then be lowered relative to the rail, by simply squeezing the lever 14, thus permitting the fender to slowly descend under its own weight, as it pulls the line through the space between the teeth 40 and through the first and second bores 22 and 24, respectively. When the fender is lowered to its desired position, the user releases the lever 14, thus permitting the spring 42 to normally bias the teeth 40 into engagement with the line to secure the line and fender in place. A knot is preferably tied in the free end of the line to prevent it from accidentally passing through the second bore 24 when the lever 14 is squeezed open.

As will be recognized by those skilled in the art, the size and/or spring constant of the spring 42 is selected depending on the desired force to be exerted on the line when seated between the teeth 40. In the embodiment of the present invention illustrated, the spring 42 is made of stainless steel wire to prevent corrosion, which is approximately 0.06 inch in diameter, and is wound into an open coil spring having an approximately 0.5 inch diameter. In this situation, the spring 42 exerts a sufficient force in order to secure the line in place under the weight of a fender. However, the spring does permit the line to be manually pulled through the second bore 24 and between the teeth 40 when the lever 14 is in the normally closed position. One advantage of this feature, is that with more durable lines, the line can simply be pulled from its free (or knotted) end down through the second bore 24 and between the teeth 40 while holding the apparatus in place, in order to raise the fender up toward the rail. Similarly, the line on the other side of the apparatus can be pulled downward, away from the apparatus in order to lower the fender. Once the user stops pulling the line, the force exerted by the spring 42 is sufficient to secure both the line and fender in place. Thus, the apparatus of the present invention provides a uniquely simple and expedient means for adjusting and securing a line supporting a fender on a marine vessel.

Another advantage of the apparatus of the present invention, is that once the free end of the line is pulled through the second bore 24 and between the teeth 40, both the lever 14 and line can be released and the apparatus will seat itself against the rail. In other words, the fender descends under the force of gravity, thus pulling the line through the first bore 22 and driving the apparatus 10 (which is secured to the line by the teeth 40) up and into engagement with the rail. Because the weight of the fender is pulling on the line, the cut-out 26 is pulled into engagement with the rail, thus receiving the rail and seating the apparatus in place.

Yet another advantageous feature of the apparatus of the present invention, is the orientation of the second bore 24 at an acute angle relative to the longitudinal axis of the apparatus, and thus relative to the cut-outs 38 and teeth 40. When the lever 14 is squeezed into the open position and the line is pulled through the second bore 24, the line is oriented generally in line with the second bore 24, and thus generally away from the teeth 40, avoiding substantial contact with the teeth, and preventing unnecessary fraying and binding of the line.

It is noted that it is not necessary to support the fender from a rail when employing the apparatus of the present invention. As will be recognized by those skilled in the art, the cut-out 26 is adapted to be seated against any circular-shaped structure, or structure dimensioned to fit within the cut-out. It may also be desirable to form the cut-out 26 in a different shape, which may better correspond to the shape of the structure against which the apparatus is to be seated. Indeed, it is only necessary that there be some type of fixture on the vessel to wrap the line around and which can support the weight of the fender, before securing the line in place with the apparatus of the present invention.

Figure 7:
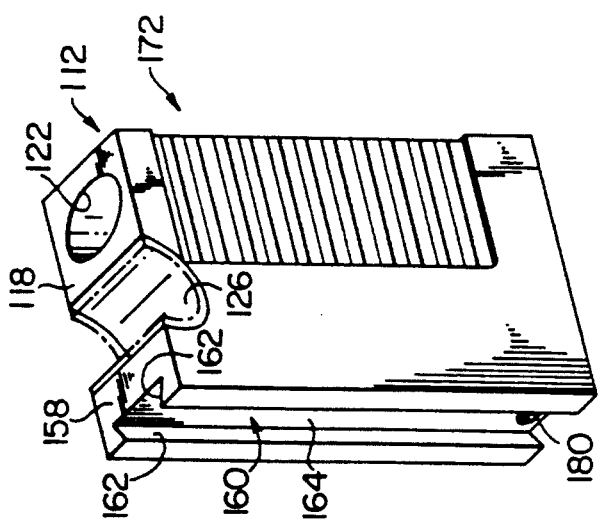
FIG. 7 is a perspective view of a modular rail attachment which can also be coupled to the lever assembly of FIG. 4 for fastening and adjusting a fender line supported on a rail on a marine vessel.
Figure 6:
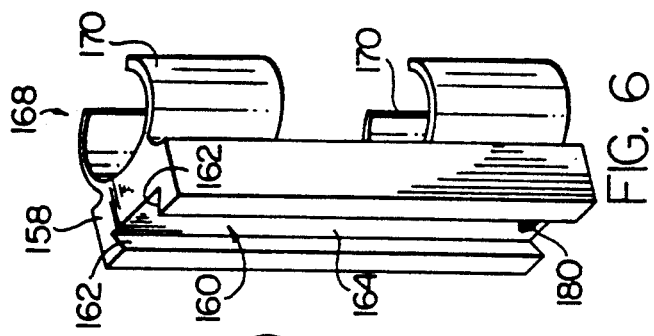
FIG. 6 is a perspective view of a modular pole attachment which can also be coupled to the lever assembly of FIG. 4 for attaching the apparatus to a pole or rod-shaped fixture on a marine vessel.
Figure 5:
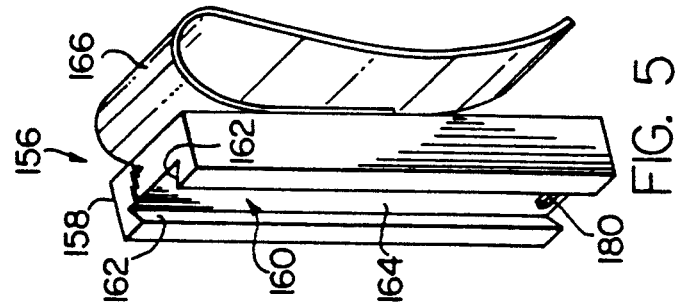
FIG. 5 is a perspective view of a modular clip attachment which is coupled to the lever assembly of FIG. 4 for attaching the apparatus to a fixture on a marine vessel, such as a windshield frame.

In FIGS. 4–7, another embodiment of the present invention is indicated generally by the reference numeral 110. This embodiment of the present invention is similar to the embodiment described above in connection with FIGS. 1–3, and therefore like reference numerals preceded by the numeral 1 are used to indicate like elements. The apparatus 110 differs from the apparatus 10 primarily by employing different modular components for attachment of the apparatus to different types of structures. FIG. 5 shows a modular clip attachment for attaching the apparatus 110 to a windshield frame, for example. FIG. 6, on the other hand, shows a modular pole attachment for attaching the apparatus 110 to a pole-shaped structure. And FIG. 7 shows a modular rail attachment, which permits attachment of the apparatus 110 to a rail, as described above in connection with FIGS. 1–3.

Figure 4:
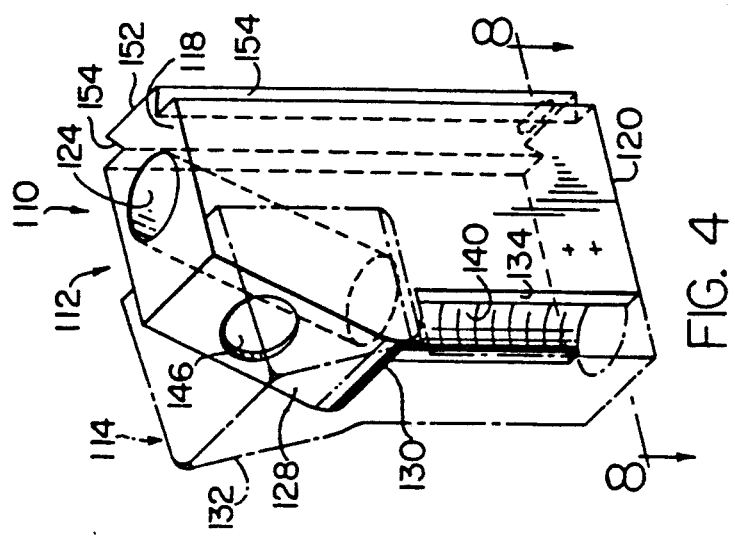
FIG. 4 is a perspective view of a lever assembly of another apparatus embodying the present invention for fastening and adjusting a line supporting a fender on a marine vessel.

Turning to FIG. 4, the apparatus 110 includes a body portion 112 which differs from the body portion 12 described above, in that it does not include the cut-out and first bore, but rather includes means for coupling the body portion 112 to a modular component, such as the modular components shown in FIGS. 5–7, for attachment to a fixture on a vessel, for example. Otherwise, the lever 114 (illustrated in dashed lines) and remaining portions of the body portion 112 (the spring 142 is not shown) are the same as described above in connection with the previous embodiment.

The means for coupling includes an elongated raised portion 152 extending along the side of the body portion 112 and oriented substantially parallel with the longitudinal axis of the apparatus. The raised portion 152 defines a pair of tapered surfaces 154 located on opposite sides of the raised portion relative to each other, and tapering inward toward the body portion 112. Each modular component includes corresponding means for coupling the component to the body portion 112.

Turning to FIG. 5, the modular clip attachment is indicated generally by the reference numeral 156, and includes a body portion 158 defining an elongated recess 160 for receiving the elongated raised portion 152, in order to attach the modular component 156 to the apparatus 110. The recess 160 is defined by a pair of tapered walls 162, each tapering in the same direction, and at approximately the same angle as a respective tapered wall 154 on the elongated raised portion 152, and a substantially flat wall 164 extending between the tapered walls 162. The modular component 156 is coupled to the body portion 112 by inserting and sliding the elongated raised portion 152 into the recess 160, which is secured in place within the recess by cooperation of the tapered walls 154 and 162. As shown in FIG. 5, a flexible clip 166 is coupled to the other side of the modular body portion 158 for attaching the apparatus to any suitable structure, such as a windshield frame or a lifeline on a marine vessel.

The apparatus 110 employed with the modular clip attachment 156 can similarly be used to secure and adjust a fender line on a vessel. In this instance, the lever 114 is squeezed toward the body portion 112, and the free end of the line is passed through the space between the teeth 140 and the bore 124. When the lever 114 is released, the teeth 140 are biased into engagement with the line by the spring 142 (not shown), and the apparatus is fixed to the line. The clip 166 is then secured to any suitable structure on the vessel, such as a windshield frame. The position of the fender can then be adjusted by manipulating the lever and/or pulling the line through the apparatus as described above.

Turning to FIG. 6, the modular pole attachment is indicated generally by the reference numeral 168, and differs from the modular clip attachment 156 in that it includes a pair of flexible c-shaped clips 170 coupled to one side of the modular body portion 158, instead of the clip 166. The c-shaped clips 170 are particularly suitable for attachment to a pole or rod-shaped structure. As will be recognized by those skilled in the art, numerous types of attachment mechanisms can be incorporated into the modular attachment component of the present invention for attaching the apparatus to any type of structure.

In FIG. 7, the modular rail attachment is indicated generally by the reference numeral 172, and includes the same body portion 158 with recess 160 and tapered surfaces 162 for modular attachment. The modular rail attachment 172 also includes a first bore 122 and a semicircular cut-out 126, thus enabling attachment of the apparatus 110 to a rail as described above. Accordingly, by attaching the modular rail attachment 172 to the apparatus 110, it has all of the same features as the apparatus 10 described above in connection with FIGS. 1-3.

Figure 8:
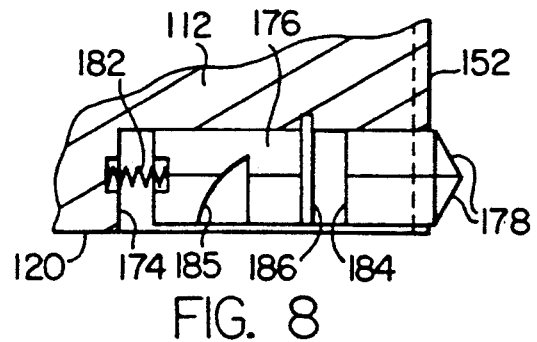
FIG. 8 is a partial cross-sectional view of the apparatus of FIG. 4 taken along the line 8—8 of FIG. 4, illustrating the plunger mechanism for locking a modular attachment to the apparatus.

The apparatus 110 also includes means for locking any of the various modular components to the apparatus, as shown in detail in FIG. 8. The body portion 112 defines a chamber 174 adjacent the bottom wall 120, which receives a spring-loaded plunger 176. The free end of the plunger 176 projects through an aperture in the elongated raised portion 152, and defines a pair of tapered surfaces 178 on its tip. As can be seen, each surface 178 tapers outward from the center of the plunger 176, and is shaped to be received within a corresponding recess 180 formed within the base wall 164 in each modular attachment (see FIGS. 5-7). A spring 182 is seated between the plunger 176 and the wall defining the chamber 174 to bias the plunger into engagement with the corresponding recess 180 in each respective modular attachment. An aperture 184 is formed through the plunger 176, and a pin member 186 extends through the aperture 184 and is coupled to the wall of the chamber 174. As can be seen, the width of the aperture 184 defines the degree to which the plunger can move in response to the force of the spring 182.

In the operation of the locking mechanism, when the elongated raised portion is inserted into the recess 160 of a respective modular attachment, the base wall 164 of the recess slides against the tapered wall 178 of the plunger 176, and forces the plunger to retract into the chamber 174. Then, when the recess 180 is moved into alignment with the plunger, the spring 182 is permitted to drive the plunger outward and seat the tapered surfaces 178 into engagement within the recess 180. This action generates a clicking sound, signalling to the user that the modular attachment is secured in place. The plunger 176 also prevents separation of the modular attachment from the body portion 112 during use, requiring a certain threshold force directed in the longitudinal direction of the apparatus in order to dislodge the plunger 176 from the recess 180. Of course, the characteristics of the spring and plunger can be selected to control the magnitude of the force required to dislodge the plunger from the recess.

It is noted that the apparatus of the present invention is adaptable for use with any size line, and likewise can be attached to nearly any structure on a vessel. The dimensions of the first and second bores can be selected to handle any size line, or a single dimension can be selected to handle a range of different size lines. Moreover, the bores do not have to be circular in shape, but rather may take on an oval or other shape. Similarly, the cut-out in the top surface of the apparatus can be made in any shape or in any desired dimension for attachment to any size rail, or other different shaped structures. If desired, a larger size cut-out can be provided, and different size saddle members can be provided to seat within the cut-out, and thereby adjust the size of the cut-out to match a particular size rail, as indicated typically in dashed lines in FIG. 7. The saddle member can be fixed to the surface of the cut-out 126 by means of a fastener or with a suitable adhesive.

I claim:

1. An apparatus for fastening a line supporting a fender from a fixture on a vessel, comprising:
 a body portion defining a first aperture through the body portion for receiving the line, a second aperture through the body portion and spaced apart from the first aperture for receiving the line after it is passed through the first aperture, and a support surface located between the first and second apertures for engaging a corresponding surface of the fixture to support the body portion against the surface of the fixture, the line between the first and second apertures forming a loop surrounding at least a portion of the fixture to maintain the support surface in engagement with the corresponding surface of the fixture and suspend the line and fender from the fixture;

a lever member defining a line-engaging surface and being pivotally coupled to the body portion and movable into a first position toward an opposing surface defining the second aperture to engage the line received through the second aperture, and movable into a second position away from the opposing surface defining the second aperture to release the line within the second aperture and adjust the position of the fender relative to the fixture; and a biasing member coupled between the lever member and the body portion normally biasing the line-engaging surface of the lever member into engagement with the line extending through the second passageway to fasten the line to the apparatus and fix the position of the fender relative to the fixture.

2. An apparatus as defined in claim 1, wherein the biasing member includes a coil spring seated between the lever member and the body portion.

3. An apparatus as defined in claim 1, wherein at least one of the body portion and the lever member defines a generally tooth-shaped surface for engagement with the line to secure the line relative to the apparatus.

4. An apparatus as defined in claim 1, wherein the support surface defines a recess for receiving a rail for securing the apparatus and line to the rail.

5. An apparatus as defined in claim 1, wherein the second aperture is defined by an elongated recess formed at least partially by the body portion.

6. An apparatus as defined in claim 5, wherein the recess is substantially semi-circular shaped.

7. An apparatus as defined in claim 5, wherein the recess is defined by a surface including a plurality of raised surface areas and corresponding recessed surface areas for engaging the line.

8. An apparatus as defined in claim 7, wherein the plurality of raised surface areas and corresponding recessed surface areas form a plurality of teeth.

9. An apparatus for fastening a line, comprising:
a body portion defining at least one aperture for receiving a line;
a lever member coupled to the body portion, wherein a passageway is defined between the lever member and an opposing surface of the body portion for receiving the line passed through the at least one aperture;
a biasing member coupled between the lever member and the body portion for normally biasing the lever member into engagement with the line extending through the passageway to fasten the line to the apparatus;
means for attaching a modular attachment component to the apparatus; and
a modular attachment component for coupling the apparatus to a supporting structure, wherein at least one of the means for attaching and the modular attachment component defines a recess, and the other of the means for attaching and the modular attachment component includes an elongated raised portion received within the recess for coupling the means for attaching to the modular attachment component.

10. An apparatus as defined in claim 9, wherein the modular attachment component includes at least one recess for receiving at least a portion of a fixture on a vessel for seating the apparatus against the fixture.

11. An apparatus as defined in claim 9, wherein the elongated raised portion defines at least one tapered wall and the recess is defined by at least one corresponding tapered wall for securing the raised portion within the recess.

12. An apparatus for fastening a line, comprising:
a body portion defining at least one aperture for receiving a line;
a lever member coupled to the body portion, wherein a passageway is defined between the lever member and an opposing surface of the body portion for receiving the line passed through the at least one aperture;
a biasing member coupled between the lever member and the body portion for normally biasing the lever member into engagement with the line extending through the passageway to fasten the line to the apparatus;
means for attaching a modular attachment component to the apparatus; and
a modular attachment component for coupling the apparatus to a supporting structure, wherein the modular attachment component includes at least one flexible chip for attachment to a fixture on a vessel.

13. An apparatus for fastening a line, comprising:
a body portion defining at least one aperture for receiving a line;
a lever member coupled to the body portion, wherein a passageway is defined between the lever member and an opposing surface of the body portion for receiving the line passed through the at least one aperture;
a biasing member coupled between the lever member and the body portion for normally biasing the lever member into engagement with the line extending through the passageway to fasten the line to the apparatus;
means for attaching a modular attachment component to the apparatus; and
a modular attachment component for coupling the apparatus to a supporting structure, wherein the modular attachment component defines at least one aperture for receiving the line through the modular attachment component.

14. An apparatus for fastening a line, comprising:
a body portion defining at least one aperture for receiving a line;
a lever member coupled to the body portion, wherein a passageway is defined between the lever member and an opposing surface of the body portion for receiving the line passed through the at least one aperture;
a biasing member coupled between the lever member and the body portion for normally biasing the lever member into engagement with the line extending through the passageway to fasten the line to the apparatus;
means for attaching a modular attachment component to the apparatus;
a modular attachment component for coupling the apparatus to a supporting structure; and
a plunger member coupled to one of the body portion and the modular attachment component, and including means for biasing the plunger member into the other of the body portion and the modular attachment component to substantially fix the body portion and modular attachment component relative to each other.

15. An apparatus for fastening a line on a marine vessel, comprising:
- a body portion defining a first aperture for receiving the line, and a second aperture spaced apart from the first aperture for receiving the line passed through the first aperture and forming a loop with the line between the first and second apertures for surrounding at least a portion of a fixture on the vessel to support the body portion against a surface of the fixture;
- a lever member pivotally mounted to the body portion defining a line-engaging surface, and movable between a first position toward an opposing surface defining the second aperture to engage the line received through the second aperture, and a second position away from the opposing surface defining the second aperture to release the line within the second aperture; and
- a biasing member coupled between the lever member and the body portion, and normally biasing the line-engaging surface into the first position in engagement with the line extending through the second aperture to secure the line relative to the apparatus.

16. An apparatus as defined in claim 15, wherein the biasing member is mounted between one end of the lever member and the body portion for normally biasing the other end of the lever member into engagement with the line extending through the second aperture.

17. An apparatus as defined in claim 15, wherein the biasing member includes an open coil spring.

18. An apparatus as defined in claim 15, wherein the body portion defines a recess forming at least part of the axially elongated passageway, and the surface of the recess is defined by a plurality of raised surface areas and corresponding recessed surface areas for engaging the line.

19. An apparatus as defined in claim 15, further including means for attaching a modular attachment component to the apparatus.

20. An apparatus as defined in claim 15, further including a modular attachment component for coupling the apparatus to a supporting structure.

21. An apparatus as defined in claim 20, wherein at least one of the body portion and the modular attachment component defines a recess and the other of the body portion and the modular attachment component includes an elongated raised portion received within the recess for coupling the modular attachment component to the body portion.

22. An apparatus for fastening a line on a marine vessel, comprising:
- a body portion defining an aperture for receiving the line;
- a lever member coupled to the body portion, and an axially elongated passageway defined between the lever member and an opposing surface of the body portion and in communication with the aperture for receiving the line extending through the aperture; and
- a biasing member coupled between the lever member and the body portion for normally biasing the lever member into engagement with the line extending through the passageway to secure the line relative to the apparatus, wherein the aperture is oriented at an acute angle relative to the axially elongated passageway.

23. An apparatus for fastening a line supporting a fender, and suspending the fender from a fixture on a marine vessel, comprising:
- a body portion including means for forming a loop with the line extending through the body portion including a first unobstructed passageway formed through the body portion for receiving the line through the body portion, and a second passageway formed through the body portion and spaced apart from the first passageway for receiving the line passed through the first passageway and forming a loop with the line between the first and second passageways surrounding at least a portion of the fixture on the vessel;
- a line-engaging member defining a line-engaging surface, and pivotally mounted to the body portion and movable between a first position wherein the line-engaging surface is moved toward an opposing surface defining the second passageway for engaging the line received through the second passageway, and a second position wherein the line-engaging surface is moved away from the opposing surface defining the second passageway for releasing the line received through the second passageway and permitting passage of the line through the second passageway for adjusting the position of the fender relative to the vessel; and
- means for normally biasing the line-engaging member into the first position to fix the position of the fender suspended from the fixture on the vessel.

24. An apparatus as defined in claim 23, wherein the body portion includes a support surface located between the first and second passageways and shaped for engagement with a corresponding surface on the fixture of the vessel to support the body portion against the surface of the fixture.

* * * * *